Oct. 29, 1940. J. L. BRACK 2,220,035
TRAP DOOR AND STEP ARRANGEMENT
Filed Sept. 23, 1938 5 Sheets-Sheet 1
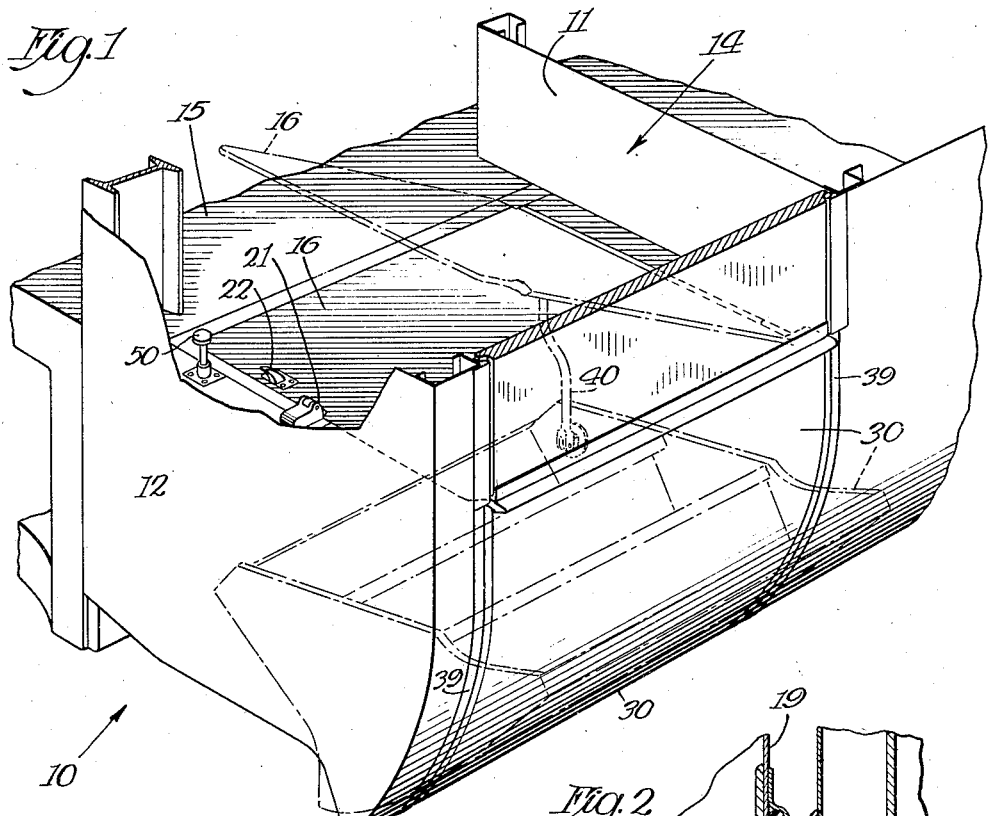
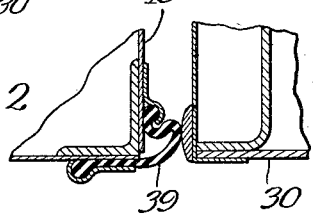
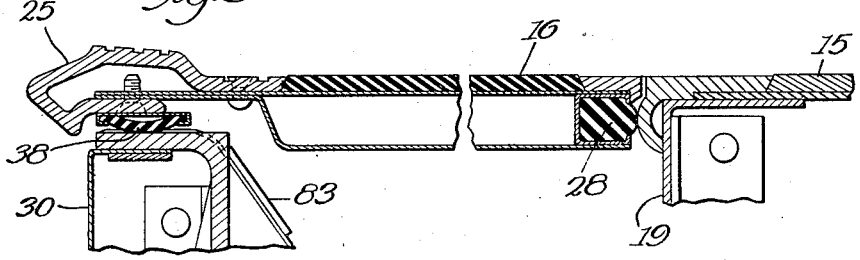
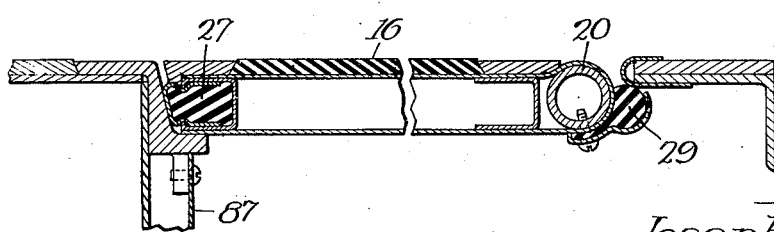
Inventor:
Joseph L. Brack
By Oscar Hochberg Atty.

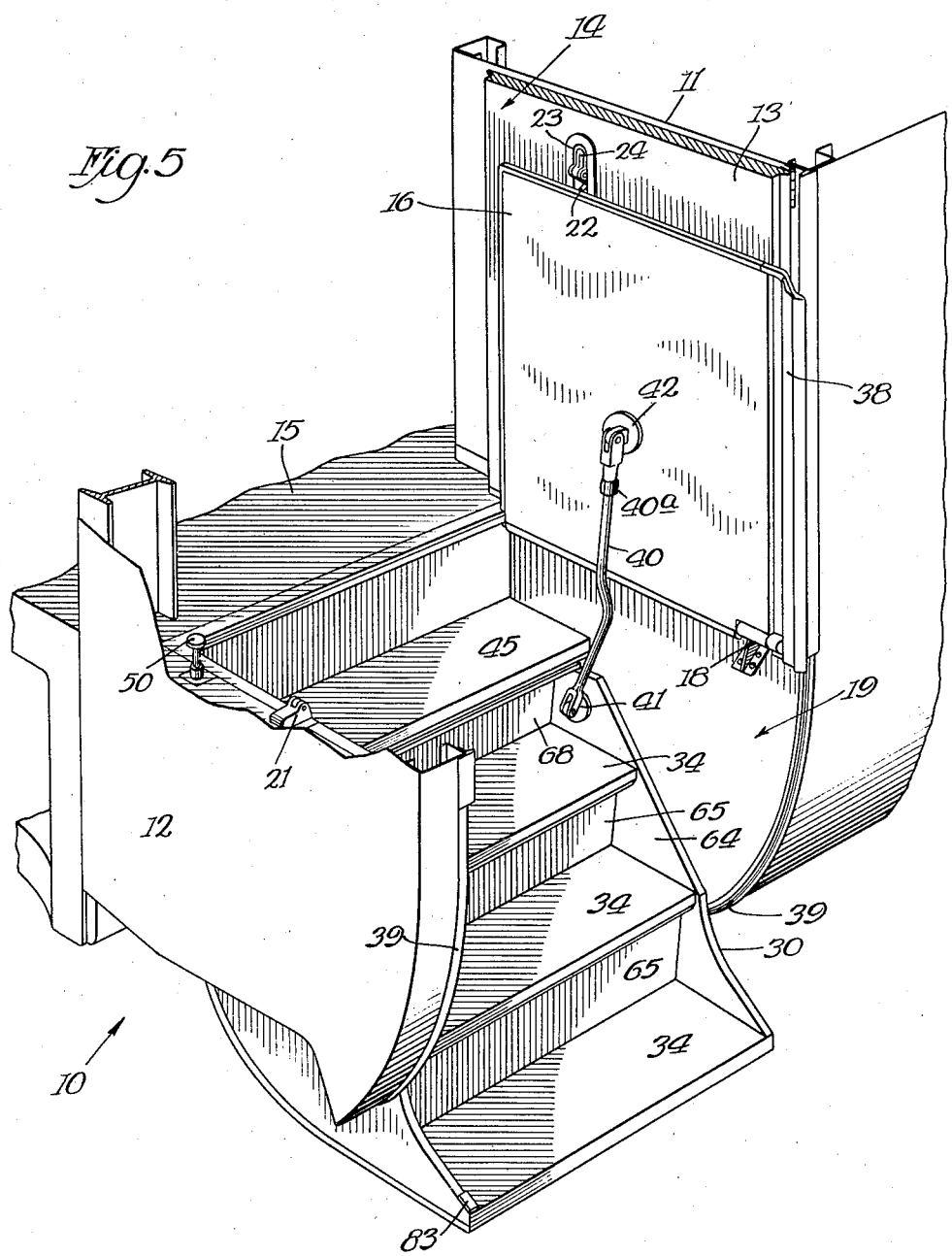

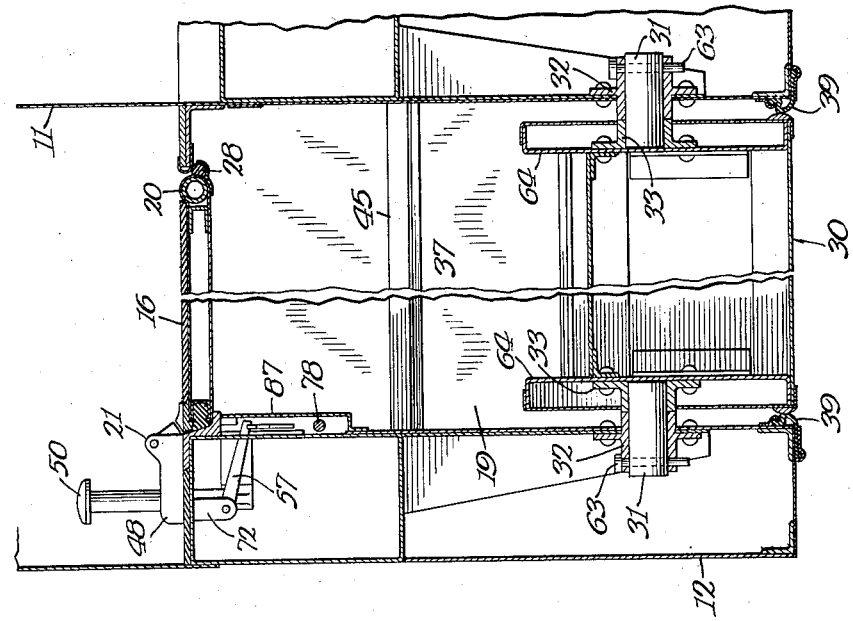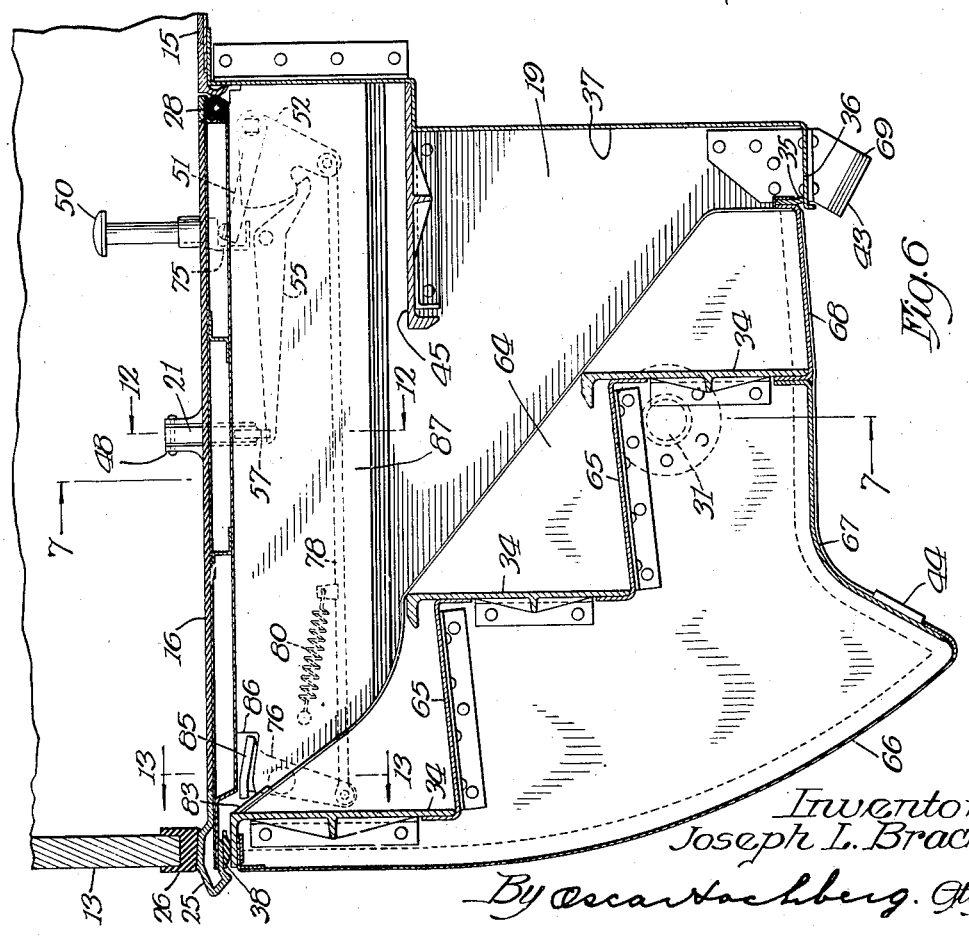

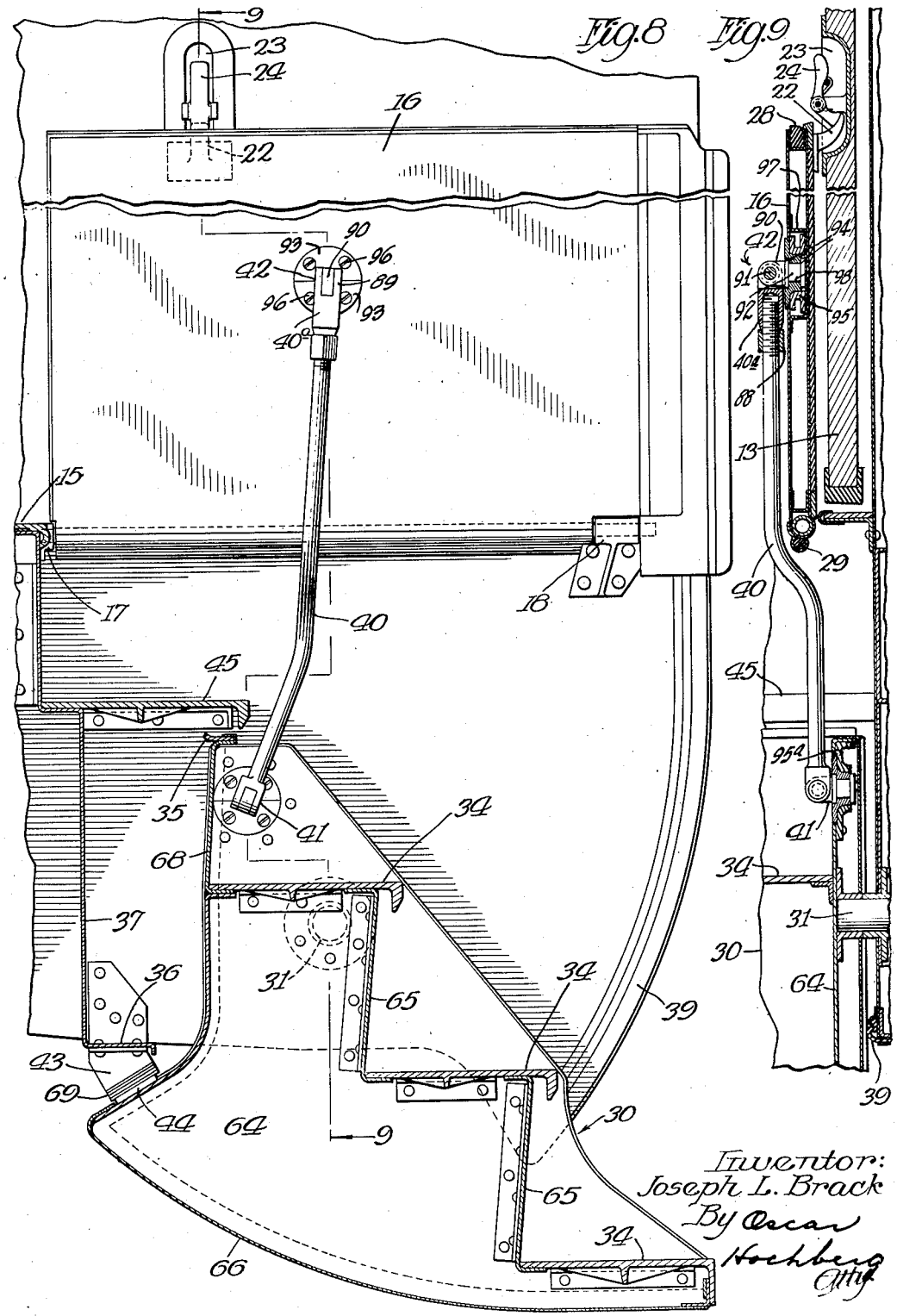

Oct. 29, 1940.   J. L. BRACK   2,220,035
TRAP DOOR AND STEP ARRANGEMENT
Filed Sept. 23, 1938   5 Sheets-Sheet 5
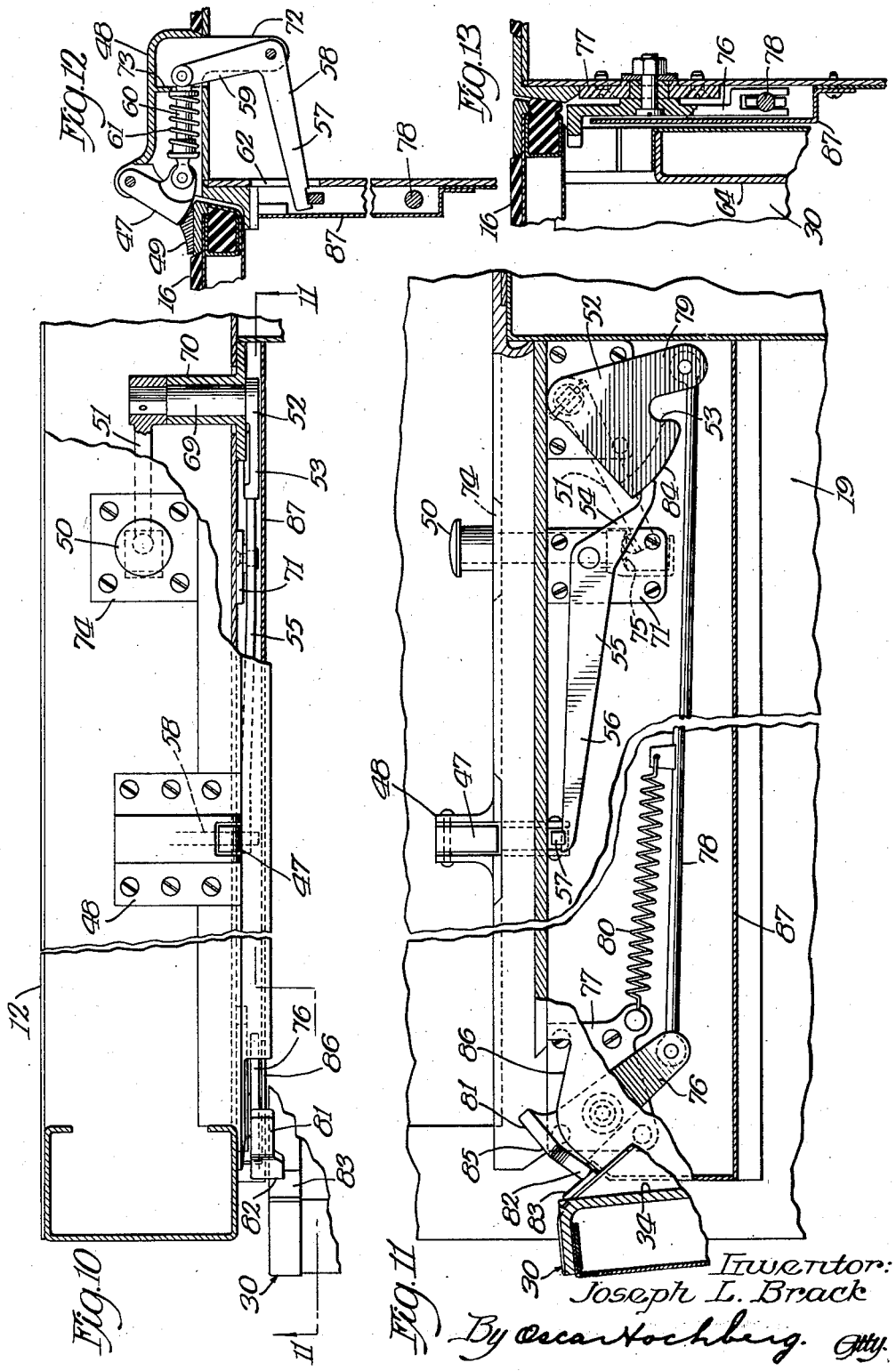
Inventor:
Joseph L. Brack
By Oscar Hochberg. Atty.

Patented Oct. 29, 1940

2,220,035

UNITED STATES PATENT OFFICE 2,220,035

TRAP DOOR AND STEP ARRANGEMENT

Joseph L. Brack, Chicago, Ill., assignor to Pullman-Standard Car Manufacturing Company, Chicago, Ill., a corporation of Delaware Application September 23, 1938, Serial No. 231,332

16 Claims. (Cl. 105—430)

This invention relates to a folding trap door and step construction for railway cars and has for its primary object the provision of such an arrangement in which the steps and trap door are interconnected for operation simultaneously, and so designed that the steps, in the closed position of the parts, overbalance the weight of the trap door to open it upon release of trap door holding means and are counterbalanced thereby in an intermediate open position of both members, whereby the trap door may then be grasped and manually impelled to full open position, thereby moving the steps to full open position and which may be closed by forcing the trap door from the intermediate position to fully closed position.

An important feature of the invention is the elimination of all accessory parts for balancing the step and trap door, whereby these members are balanced one with respect to the other solely through their respective opposed, avoirdupois weights.

Another and important object of the invention is the provision of means for automatically breaking any seal between the relatively moving parts caused by the formation of ice or the like and operable simultaneously with trap door releasing means.

The foregoing and other objects are attained by the mechanism illustrated in the accompanying drawings, in which—

Fig. 1 is a fragmentary perspective view of a railway car vestibule equipped with the folding steps and trap door of this invention and showing the parts in closed position and indicated in broken lines in their intermediate position.

Fig. 2 is a fragmentary, sectional view through the means for sealing the step and step well against the entrance of moisture and dirt or the like;

Fig. 3 is a transverse, sectional view through the trap door illustrating its sealing relation with respect to the step;

Fig. 4 is a longitudinal, sectional view through the trap door illustrating its hinged-edge sealing means and the supported free end thereof;

Fig. 5 is a perspective view of the vestibule with the steps and trap door in full open position;

Fig. 6 is a transverse, sectional view through the vestibule illustrating the steps and trap door in their closed position;

Fig. 7 is a vertical, longitudinal, sectional view taken on line 7—7 of Fig. 6 through the pivotal axis of the folding steps and showing the trap door releasing means;

Fig. 8 is a sectional view similar to Fig. 6 but illustrating the trap door and steps in their full open position;

Fig. 9 is a vertical, sectional view taken on the line 9—9 of Fig. 8 with the parts in their full open position;

Fig. 10 is a plan view of the portion of the vestibule adjacent the end wall and having parts broken away better to illustrate the ice breaking arrangement;

Fig. 11 is a sectional view, taken on the line 11—11 of Fig. 10, illustrating the trap door latch and ice breaking arrangement in detail and its method of operation with the parts in their final position of movement to release the trap door and open the step;

Fig. 12 is a sectional view, taken on the line 12—12 of Fig. 6, illustrating the trap door releasing mechanism; and Fig. 13 is a sectional view, taken on the line 13—13 of Fig. 6, illustrating the ice breaker arrangement.

In the drawings, 10 represents a railway car having a body end wall 11 and a vestibule end wall 12 which, together with side door 13, define a vestibule 14. Platform 15 provides a floor for the vestibule. A trap door 16, flush with the surface of the platform, covers a step well 19 beneath the level of the platform and between the end walls 11 and 12. The trap door is hinged adjacent the end wall 11 as by brackets 17 and 18 secured to the end wall, which provide pivotal mounting means for tubular axle 20 passing entirely through the hinged edge of the trap door. The trap door is secured in its lowered, closed position by means of a latch 21, more fully hereinafter to be described, and, after the vestibule side door 13 has been opened and secured against the end wall 11 by means of door holding devices (not shown), is adapted to be raised against the outer face of the side door 13 and securely held in opened position by means of a catch 22 on the trap door which enters a recess 23 on the outer face of the side door and is automatically engaged by a gravity-actuated member 24 pivotally mounted in the recess 23 and which, when desired, may be grasped and manually rotated about its pivot for disengagement from the catch 22, whereupon the trap door may be lowered.

The trap door, at its outer edge, is provided with a threshold 25 which is engaged by weatherstrip 26 on the side door to provide a weather seal therebetween in the closed position of the side door, and the remaining edges of the trap door about the step well 19 are weatherstripped, as at 27, 28 and 29, whereby the entrance of dirt and moisture, or the like, is positively prevented.

Steps 30 are pivotally mounted in the step well 19, at right angle to the hinged axis of the trap door, by means of axles 31 removably secured in brackets 32 mounted in the respective side walls of the recess 19 and protruding therethrough into brackets 33 mounted upon the respective side walls of the steps. Pins 63 secure the axles 31 in the brackets 32. The steps are provided with a plurality of treads 34 extending between and secured to side walls 64, together with risers 65, and have a fully enclosed back side afforded by sheathing 66 and 67 and riser 68 which, in the closed position, provides a fully enclosed step having a streamlined contour exactly to that of the car side in which the steps are mounted, as best shown in Fig. 6, and which also affords means of fully sealing the step well against the weather. Weatherstrip 35, secured to the riser 68, seals the lower edge of the step in closed position against the horizontal, outwardly extending flange 36 of the inner wall 37 of the step well, while weatherstrip 38 seals the upper edge of the step in closed position against the lower side of the trap door upon which the weatherstripping is mounted, and flexible weatherstripping 39, secured to the side corners of the step well, as best shown in Fig. 2, seals the respective side edges thereof.

The steps 30 are interconnected with the trap door 16 for simultaneous operation therewith by means of a strut 40 connected to the respective members by means of universally movable, doubly pivoted joints 41 and 42, respectively. The connection of the strut 40 to the step is made to one side of the pivotal axis of the steps on one side wall 64 and to the lower side of the trap door 16 in such manner that when the steps are in their raised position the trap door is closed flush with the platform 15, and when the trap door is raised against the open side door 13 adjacent the end wall 11 the steps are in their fully open, operative position—providing access to the platform 15. The connection 42 to the trap door, as best shown in Fig. 8, is disposed substantially in vertical alignment with the axis 31 of the steps, and the connection 41 to the step is disposed to the side of axis 31 in the direction in which the steps rotate to close, whereby the strut 40, in the fully open position of the parts, does not reach dead center but is initially inclined so that when the trap door is lowered the thrust on the steps is immediately in a direction tending to rotate the steps to closed position. An adjustment is provided in the strut 40 in the form of a threaded connection 40ª whereby the position of the step with respect to the trap door in the closed position of the parts may be regulated merely by changing the length of the strut. The adjustable connection comprises the member 40ª threaded onto the end of rod 40 and having a tapering end which is gripped by a conical friction-type lock nut 88 to fix the adjustment. Member 40ª is bifurcated to provide a jaw 89 for pivotal connection to pivot-trunnion 90 by means of pivot pin 91. The trunnion portion 92 rotates in a split bearing 93 and has flanges 94 engaging opposite sides of the bearing by means of which it is held in place. In assembling the joint 42, the two parts of the split bearing 93 are placed on trunnion 92 and the whole then placed in the closely fitting retaining bracket 95 in which it is removably secured by means of screws 96 passing through the flanged perimeter of the bearing parts and taking the retainer 95. The retainer bracket 95 comprises an annular member secured in the underside of the trap door 16 in reinforcing pan 97 by means of spot-welding and having opening 98 just large enough to receive the bearing 93. The pan 97 is removably secured on the inner side of the lower sheet of the trap door by means of screws (not shown) before complete assembly of the trap door and the split bearing 93 permits installation and adjustment of the strut assembly 40 at the erection location. It will be seen that the pivot 91 and trunnion 92 permit pivoting in directions perpendicular to each other whereby universal swiveling action of the joint 42 is obtained and by means of which, in combination with the similar joint 41 at the steps, the downward motion of the trap door 16 is transmitted through the strut 40 and converted to a rotating motion of the steps in a direction at right angle to the movement of the trap door. The joint 41 at the connection of the strut to the steps is exactly like the joint 42 except for a slight difference in the retaining bracket 95ª which is secured in the side wall 64 of the step assembly by riveting and requires no further description.

The steps are shaped to find positive support, in their open position, against a bumper 43 mounted on the lower side of the horizontal flange 36. A resilient pad 44, secured on the outer side of the step on the surface of the enclosure sheet 67, noiselessly engages the bumper and thereby provides a rigid support in the open position which insures stability of the step in use. The bumper 43 is provided with a plurality of shims 69 for the purpose of adjusting the stop position of the steps in their full open position in accordance with the full open position of the trap door, whereby, when the trap door is fully opened, the steps may come to rest against the positive stop afforded by the bumper 43. By the use of the adjustment 40ª, in combination with the stop 43, the steps and trap door may be adjusted to associate properly in the closed position—affording a weathertight sealing relation—and both to open fully without restriction, with the steps finding positive stabilizing support in full open position.

The step well 19 is provided with an intermediate step tread 45 projecting from the inner wall 37 thereof in overlapping relation to the top riser 68 and which provides means for lowering the height of the respective risers between the various treads 34 and 45 and the platform 15, whereby access to the platform is had in easy stages and the overall size of the pivotally mounted step assembly may be reduced.

Both the trap door 16 and steps 30 are securely held in closed position by the trap door latch 21 which comprises a retractable catch 47 pivotally mounted in a bracket 48 on the surface of the platform 15 in position for the catch 47 to overlap abutment plate 49 on the free edge of the trap door. Retraction of the catch 47 is effected by stepping on the plunger 50. The plunger 50 engages an actuating arm 51 to rotate bell-crank 52 about its pivotal axis and thereby cause arm 53 of the bell-crank to engage arm 54 on fulcrum lever 55, the arm 56 of which engages one arm 57 of a second bell-crank 58 mounted transversely to the bell-crank 52 and lever 55, as best shown in Fig. 12. Arm 59 of bell-crank 58 is connected to the catch 47 by means of a rod 60 and acts directly to retract the catch 47 as the bell-cranks and fulcrum lever are operated upon depression of the plunger 50. Coil spring 61, about the rod 60, returns the catch 47 to its locking position upon release of the plunger 50. The arm 53 on bell-crank 52 is provided with an extended arcuate bearing surface 84 against which the arm 54 of fulcrum lever 55 is adapted to bear upon further rotation of the bell-crank after the initial releasing movement and thereby retain the latch 47 in released position during such continued movement.

Both the bell-crank 52 and fulcrum lever 55 are disposed upon one of the side walls of the step well 19, while the bell-crank 58 is disposed upon the opposite side of the same side wall with arm 57 extending through slot 62 in the side wall to be engaged by the fulcrum lever 55, and the whole mechanism is concealed by a sheet metal enclosure 87. The bell-crank 52 is pivotally mounted by means of an integral axle 69 extending through bearing bracket 70 which is secured to and penetrates the side wall of the step well, and actuating arm 51 is removably secured on the squared end of the axle on the other side of the side wall in position to be engaged by the plunger 50. Fulcrum lever 55 is pivotally secured on bracket 71 disposed wholly on the step well side of the side sheet in position to be engaged by arm 53 of bell-crank 52 and to engage arm 57 of fulcrum lever 55. Bell-crank 58 is pivotally mounted, at right angle to the fulcrum lever 55, upon depending extension 72 of the trap door latch bracket 48, and vertical arm 59 extends into the bracket 48 behind wall 73 against the opposite side of which the spring 61 is seated to exert the pressure necessary to return the latch 47 to operative position, and the horizontal arm 57, as above described, extends through slot 62 for engagement with and to be actuated by fulcrum lever arm 56. Plunger 50 is mounted for reciprocation through a bracket 74 secured to the platform 15 and is provided with a jaw 75 to insure positive engagement with the actuating arm 51. It will be seen that by depressing the plunger 50 the latch 47 is retracted by the actuation of bell-cranks 52 and 58 and fulcrum lever 55 to permit the trap door to rise under the influence of the steps 30, as hereinafter described.

The weight of the steps and the location of their pivotal axis 31 and the connections of the strut 40 to the steps and trap door are such that the weight of the steps, in the closed position of the connected parts, overbalances the weight of the trap door and thereby creates a force which causes the trap door and steps to assume approximately the intermediate position, indicated by broken lines in Fig. 1, where, due to the disposition of the parts and their connections, the avoirdupois weights of the two members balance and the trap door may then be grasped and manually actuated to its full open position against the open side door 13, thereby rotating the steps to their full open position against stop 43. Thus, as a safety measure, the steps are prevented from dropping suddenly to full open position and the trap door likewise prevented from rising suddenly upon release of catch 47, and an easy, balanced and quiet operation of the parts is assured without the necessity for using great force in either the opening or closing movements.

It is to be noted that the balanced operation of the steps and trap door is achieved strictly by balancing the avoirdupois weight of one member against that of the other and so disposing the connections 41 and 42 of the strut 40 to the steps and trap door respectively, with respect to the pivotal axes of the respective members, that the operation desired is obtained without the use of balancing springs and in which the steps overbalance the weight of the trap door in the closed position of the parts thereby setting up a tendency to open, but is balanced thereby in an intermediate position in the interest of easy and safe, quiet operation. It will be seen that while the steps and trap door open immediately upon release of latch 47, they cannot inadvertently be opened by stepping on the plunger 50 while the vehicle of which they form a part is in motion. After passenger loading has been completed, the trap door 16 is lowered, thus raising the steps 30, and secured by latch 47 which is operated by merely pressing the trap door therebeyond and which springs back in overlapping relation to the abutment plate 49, thereby securely to hold both the trap door and steps in closed position. The vestibule side door 13 is then closed and fastened and, as best shown in Fig. 6, is thus disposed in overlapping relation to the trap door adjacent the side door threshold 25 whereby even though the plunger 50 is depressed—thus releasing the latch 47—the trap door and, therefore, the steps cannot open due to such overlapping relation of the side door. The side door must first be opened before the trap door and steps can be opened, and, vice versa, the steps and trap door must be closed before the side door can be closed, whereby, in service, the arrangement affords a double safety measure since, by opening the side door first, the operator can then see if any person might be standing near the steps before lowering them, and the steps cannot be left in open position in transit due to the fact that, with the trap door, they must first be closed in order to close the side door.

Mechanism associated with the trap door release 21 is provided for automatically breaking any ice seal that may be formed between the steps and trap door and the step well upon operation of the trap door release and is adapted to initiate the opening movement of the parts when, for any reason, they might otherwise be held fast due to binding or sticking of the parts. A fulcrum lever 76 is pivotally mounted, intermediate its ends, on bracket 77 in the enclosure 87 in position to exert a camming action upwardly on the lower surface of the trap door while simultaneously prying the steps outwardly and downwardly. The lower extremity of the lever 76 is connected by rod 78 to arm 79 on the bell-crank 52 and operates coincidently and subsequently to the trap door latch 47 upon depression of the plunger 50, and coil spring 80 exerts tension between the rod 78 and bracket 77 to return the actuating member 76, together with bell-crank 52 and plunger 50, to normal, retracted position upon release of pressure from the plunger. The lever 76 is provided with a head 85 having a camming surface 81 which engages the lower surface of the trap door 16, adjacent the free edge thereof, to force it upwardly, and also has a widened striking portion 82 which engages striking plate 83 on the steps to force them away from the trap door, after which the operation, of course, is by gravity. The entire ice-breaking mechanism is concealed within the enclosure 87 with only the head 85 of lever 76 protruding through the cutout 86, as best shown in Fig. 11, for engagement with the steps and trap door. It will be seen that the leverage multiplying action of the bell-crank 52, due to the relative lengths of arms 51 and 79, and the location of the fulcrum point of lever 76 with respect to the length thereof, enables the application of force to the steps and trap door of greatly increased power over that exerted on operating plunger 50 whereby the mechanism is adapted to exert a powerful opening thrust on the steps and trap door with a minimum of force on the plunger 50.

From the foregoing it will be seen that there has been provided a folding trap door and step arrangement interconnected for simultaneous operation with adjustment means in the connection and having an adjustable rigid stop for the steps in their open position and in which the parts are so balanced in relation to each other by their respective avoirdupois weights that the steps in their closed position overbalance the trap door, thereby causing both to open to an intermediate position where both parts balance for manual actuation thereafter. Means are provided for locking both the steps and trap door in both closed and open positions and each having engagement with the trap door alone, and other means engageable with both the steps and trap door and capable of exerting powerful leverage action are provided for initiating opening movement of the parts under adverse conditions. Safe operation of the apparatus is required by the arrangement and association of the vestibule side door with the trap door and steps whereby closing of the side door prevents opening of the trap door and steps and, in the closed position, insures the steps being in raised position.

What is claimed is:

1. A trap door and step arrangement for railway cars comprising a vestibule having a platform, a step well in the vestibule beneath the level of the platform, a trap door adapted to cover the step well hinged at one side thereof, a pivotally mounted step assembly in said step well having its pivotal axis disposed perpendicular to the hinge axis of the trap door, means connecting the steps and trap door for simultaneous opening and closing movements respectively, releasable means engageable with the trap door for securing the steps and trap door in closed position, operating means for releasing said second-named means, means engageable with the steps and trap door and operable simultaneously with and subsequently to said releasable means upon actuation of said operating means to initiate opening movement of the steps and trap door, rigid stop means engageable with the steps in their open position, releasable holding means engageable with the trap door in its open position, and a side door in said vestibule overlying said trap door in the closed position whereby the side door must first be opened before said trap door and steps can be opened and the steps and trap door must first be closed before the side door can be closed, said releasable holding means being disposed on the outer side of said side door.

2. A trap door and step arrangement for railway cars comprising a vestibule having a platform, a step well in the vestibule beneath the level of the platform, a trap door adapted to cover the step well hinged at one side thereof, a pivotally mounted step assembly in said step well, means connecting the steps and trap door for simultaneous opening and closing movements respectively, releasable means engageable with the trap door for securing the steps and trap door in closed position, operating means for releasing said second-named means, means engageable with the steps and trap door and operable simultaneously with and subsequently to said releasable means upon actuation of said operating means to initiate opening movement of the steps and trap door, and a side door in said vestibule overlying said trap door in the closed position whereby the side door must first be opened before said trap door and steps can be opened and the steps and trap door must first be closed before the side door can be closed.

3. A trap door and step arrangement for railway cars comprising a vestibule having a platform, a step well in the vestibule beneath the level of the platform, a trap door adapted to cover the step well hinged at one side thereof, a pivotally mounted step assembly in said step well having its pivotal axis disposed perpendicular to the hinge axis of the trap door, means connecting the steps and trap door for simultaneous opening and closing movements respectively at right angles, releasable means engageable with the trap door for securing the steps and trap door in closed position, means engageable with the steps and trap door and operable simultaneously with and subsequently to said releasable means to initiate opening movement of the steps and trap door, rigid stop means engageable with the steps in their open position, releasable holding means engageable with the trap door in its open position, and a side door in said vestibule overlying said trap door in the closed position whereby the side door must first be opened before said trap door and steps can be opened and the steps and trap door must first be closed before the side door can be closed, said releasable holding means being disposed on the outer side of said side door.

4. A trap door and step arrangement for railway cars comprising a vestibule having a platform, a step well in the vestibule beneath the level of the platform, a trap door adapted to cover the step well hinged at one side thereof, a pivotally mounted step assembly in said step well, means connecting the steps and trap door for simultaneous opening and closing movements respectively, releasable means engageable with the trap door for securing the steps and trap door in closed position, means engageable with the steps and trap door and operable simultaneously with and subsequently to said releasable means to initiate opening movement of the steps and trap door, and a side door in said vestibule overlying said trap door in the closed position whereby the side door must first be opened before said trap door and steps can be opened and the steps and trap door must first be closed before the side door can be closed.

5. A trap door and step arrangement for railway cars comprising a vestibule having a platform, a step well in the vestibule beneath the level of the platform, a trap door adapted to cover the step well hinged at one side thereof, a pivotally mounted step assembly in said step well having its pivotal axis disposed perpendicular to the hinge axis of the trap door, means connecting the steps and trap door for simultaneous opening and closing movements respectively, means engageable with the steps and trap door and operable to initiate opening movement of the steps and trap door, rigid stop means engageable with the steps in their open position, releasable holding means engageable with the trap door in its open position, and a side door in said vestibule overlying said trap door in the closed position whereby the side door must first be opened before said trap door and steps can be opened and the steps and trap door must first be closed before the side door can be closed, said releasable holding means being disposed on the outer side of said side door.

6. A trap door and step arrangement for railway cars comprising a vestibule having a platform, a step well in the vestibule beneath the level of the platform, a trap door adapted to cover the step well hinged at one side thereof, a pivotally mounted step assembly in said step well, means connecting the steps and trap door for simultaneous opening and closing movements respectively, means engageable with the steps and trap door and operable to initiate opening movement of the steps and trap door, and a side door in said vestibule overlying said trap door in the closed position whereby the side door must first be opened before said trap door and steps can be opened and the steps and trap door must first be closed before the side door can be closed.

7. A trap door and step arrangement for railway cars comprising a platform, a step well beneath the level of the platform, a trap door hinged at one side of and adapted to cover the step well, a step assembly pivotally mounted in said step well, means connecting the steps and trap door for simultaneous opening and closing movements respectively, releasable means engageable with the trap door to secure the steps and trap door in closed position, and operating means engageable with the steps and trap door for releasing said second-named means and imparting an upward opening thrust to the trap door and an outward opening thrust to the steps.

8. A trap door and step arrangement for railway cars comprising a platform, a step well beneath the level of the platform, a trap door hinged at one side of and adapted to cover the step well, a step assembly pivotally mounted in said step well, means connecting the steps and trap door for simultaneous opening and closing movements respectively, means for securing the trap door and steps in closed position, and means engageable directly with both the trap door and steps and adapted for releasing said second-named means and imparting initial opening forces to the trap door and steps individually.

9. A trap door and step arrangement for railway cars comprising a platform, a step well beneath the level of the platform, a trap door hinged at one side of and adapted to cover the step well, a step assembly pivotally mounted in said step well, means connecting the steps and trap door for simultaneous opening and closing movements respectively, and means engageable with the steps and trap door adapted to impart initial opening movements thereto.

10. In a railway car having a pivotally mounted step assembly and folding trap door interconnected for simultaneous operation, means for imparting initial opening movement to the steps and trap door comprising a fulcrum member engageable with the steps and trap door, operating means for actuating said fulcrum member, and leverage multiplying means between said operating means and the fulcrum member.

11. In a railway car having a pivotally mounted step assembly and folding trap door interconnected for simultaneous operation, means for imparting initial opening movement to the steps and trap door comprising a fulcrum member engageable with the steps and trap door, operating means for actuating said fulcrum member, leverage multiplying means between said operating means and the fulcrum member, and trap door locking means releasable upon actuation of said operating means.

12. In a railway car having a pivotally mounted step assembly and folding trap door interconnected for simultaneous operation, means for imparting initial opening movement to the steps and trap door comprising a fulcrum member engageable with the steps and trap door, and means for actuating said fulcrum member including a bell-crank, a connection between said bell-crank and the fulcrum member, and an operating member engageable with the bell-crank.

13. In a railway car having a pivotally mounted step assembly and folding trap door interconnected for simultaneous operation, means for imparting initial opening movement to the steps and trap door comprising a fulcrum member engageable with the steps and trap door, means for actuating said fulcrum member including a bell-crank, a connection between said bell-crank and the fulcrum member, an operating member engageable with the bell-crank, and spring means retaining the fulcrum member, bell-crank and operating member in retracted position.

14. A trap door and step arrangement for railway cars comprising a platform, a step well beneath the level of the platform, a trap door hinged at one side of and adapted to cover the step well, a step assembly pivotally mounted in said step well, means connecting the step assembly and trap door for simultaneous opening and closing movements respectively, releasable means engageable with the trap door to secure the step assembly and trap door in closed position, and operating means engageable with the step assembly and trap door for releasing said second-named means and imparting an upward opening thrust to the trap door and an outward and downward opening thrust to the step assembly.

15. A trap door and step arrangement for railway cars comprising a platform, a step well beneath the level of the platform, a trap door hinged at one side of and adapted to cover the step well, a step assembly pivotally mounted in said step well, means connecting the step assembly and trap door for simultaneous opening and closing movements respectively, releasable means engageable with the trap door to secure the step assembly and trap door in closed position, and operating means engageable with the step assembly and trap door for releasing said second-named means and imparting an upward opening thrust to the trap door and a downward opening thrust to the step assembly.

16. A trap door and step arrangement for railway cars comprising a platform, a step well beneath the level of the platform, a trap door hinged at one side of and adapted to cover the step well, a step assembly pivotally mounted in said step well, means connecting the step assembly and trap door for simultaneous opening and closing movements respectively, releasable means engageable with the trap door to secure the step assembly and trap door in closed position, and operating means engageable with the step assembly and trap door for releasing said second-named means and imparting an opening thrust to the trap door and an opening thrust to the step assembly.

JOSEPH L. BRACK.